(12) United States Patent
Stack et al.

(10) Patent No.: US 7,757,312 B2
(45) Date of Patent: Jul. 20, 2010

(54) FIXTURE FOR DISPOSING OF BODILY WASTE HAVING AN ANTI-OVERFLOW FEATURE AND A METHOD FOR MAKING THE SAME

(76) Inventors: Patrick G. Stack, 41395 Wilcox Rd., Plymouth, MI (US) 48170; Lawrence A. Trowbridge, 3828 W. County Rd. 390 N., Freetown, IN (US) 47235

(*) Notice: Subject to any disclaimer, the term of this patent is extended or adjusted under 35 U.S.C. 154(b) by 681 days.

(21) Appl. No.: 11/217,217

(22) Filed: Sep. 2, 2005

(65) Prior Publication Data
US 2007/0294815 A1 Dec. 27, 2007

(51) Int. Cl.
*E03D 11/02* (2006.01)
(52) U.S. Cl. ........................................ 4/427
(58) Field of Classification Search .................. 4/342, 4/427, 661, 252.1, 640–642, 680
See application file for complete search history.

(56) References Cited

U.S. PATENT DOCUMENTS

| 2,778,029 | A | * | 1/1957 | Young | 4/427 |
| 3,262,132 | A | * | 7/1966 | Mann | 4/427 |
| 3,411,162 | A | | 11/1968 | Palmer | |
| 4,204,285 | A | | 5/1980 | Pak | |
| 5,153,947 | A | * | 10/1992 | Markles | 4/342 |
| 7,302,714 | B2 | | 12/2007 | Orcutt | |
| 7,383,594 | B1 | * | 6/2008 | Giesken et al. | 4/427 |
| 2004/0231039 | A1 | | 11/2004 | Turkman | |
| 2005/0000005 | A1 | | 1/2005 | Giesken et al. | |

OTHER PUBLICATIONS

Written Opinion of the International Searching Authority for PCT/US05/45231.

* cited by examiner

*Primary Examiner*—Tuan N Nguyen
(74) *Attorney, Agent, or Firm*—Steve M. Clemmons; Charles W. Chandler

(57) ABSTRACT

The present invention provides for an improved bathroom fixture for flushing bodily waste materials. This fixture includes a secondary drain that communicates liquid that is backing up during a potential overflow situation into a conventional drainage sewer without any modification to that sewer.

28 Claims, 5 Drawing Sheets

FIXTURE FOR DISPOSING OF BODILY WASTE HAVING AN ANTI-OVERFLOW FEATURE AND A METHOD FOR MAKING THE SAME

BACKGROUND OF THE INVENTION

1. Field of the Invention

This invention relates to an improved bathroom fixture for flushing bodily waste materials into a drainage or sewer system. More particularly, this invention is a bathroom fixture having a secondary drainage system that prevents the fixture from overflowing.

2. Description of the Related Art

Traditional bathroom fixtures, such as toilets and urinals, may become blocked or plugged-up resulting in the flushing water and waste to overflow when the fixture is flushed. Obviously, this overflow of water and waste materials is undesirable and there is therefore a need for an improved bathroom fixture that prevents these overflows from occurring.

There have been previous attempts to prevent a blocked toilet from overflowing. These prior art anti-overflow devices are often complicated and require modification to existing plumbing within the house or building.

Some prior art references pertaining to toilet overflow devices and systems include U.S. Pat. No. 3,411,162 issued Nov. 19, 1968 to Norbert J. Palmer for "Toilet Bowl Construction"; U.S. Pat. No. 4,204,285 issued May 27, 1980 to Ian T. Pak for "Overflow Protection Apparatus"; U.S. patent application Ser. No. 10/426,201 filed May 1, 2003 by Chris Giesken et al. for "Toilet Overflow Prevention System"; and U.S. patent application Ser. No. 10/419,756 filed Apr. 22, 2003 by Samsam U. Turkman for "Stink-Free Non-Overflow Automatic Toilet".

Generally such prior art fail to provide for a simple and cost-effective means for preventing bathroom fixtures from overflowing while being readily installed in place of an existing model toilet or urinal without modification to the plumbing of the building.

BRIEF SUMMARY OF THE INVENTION

The broad purpose of the present invention is to provide an improved bathroom fixture that will not overflow if a blockage occurs in the fixture's primary drain system.

Since most toilets and urinals become blocked in the trap or at the discharge port of the fixture, this invention provides an improved bathroom fixture having a secondary drainpipe which bypasses the primary waste drain of traditional fixtures. When the primary waste drain of the fixture is blocked, the wastewater will back up in the fixture's basin until the water level reaches a plurality of secondary discharge holes formed in the upper region of the fixture's basin. The rising water flows through these discharge holes and through the secondary drain which is in fluid connection with the building's drainage/sewer system. In this manner, this invention eliminates the chance that a blockage in the fixture's primary drain will result in the fixture overflowing.

This improved bathroom fixture also provides an advantage over other toilets incorporating an anti-overflow system because this invention may be easily substituted in the place of an older toilet without any modification to the current plumbing or bathroom construction (e.g., flooring or walls). Other systems require modification to the current plumbing or additional plumbing to be installed to permit the new system to be effective. In other words, the present invention is a "drop-in" replacement for existing toilets or urinals that provides the benefit of eliminating overflows and does not require any additional modification to the bathroom or lavatory prior to replacement.

Another advantage the present invention has over other anti-overflow systems is that the present invention does not have any moving parts and is therefore cost effective and easy to maintain. Prior art systems oftentimes incorporate complicated and expensive sensors and electronic components that can break or malfunction.

Still further objects and advantages of the invention will become readily apparent to those skilled in the art to which the invention pertains, upon reference to the following detailed description.

BRIEF DESCRIPTION OF THE SEVERAL VIEWS OF THE DRAWINGS

The description refers to the accompanying drawings in which like reference characters refer to like parts throughout the several views and in which.

DETAILED DESCRIPTION OF THE INVENTION

Figure 1:
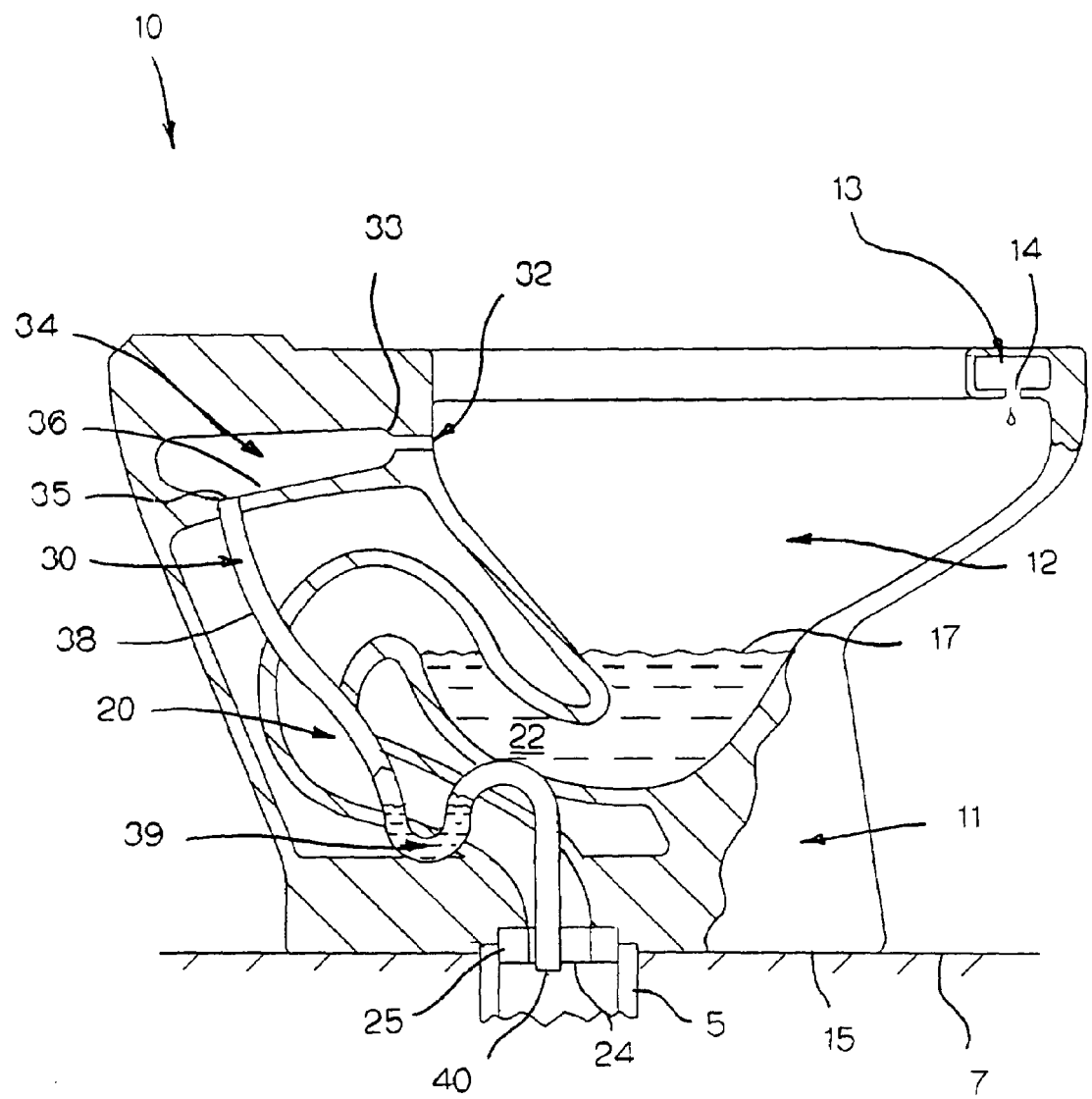
FIG. 1 is a partial cross-sectional side view of an anti-overflow fixture according to the preferred embodiment of the invention.
Figure 2:
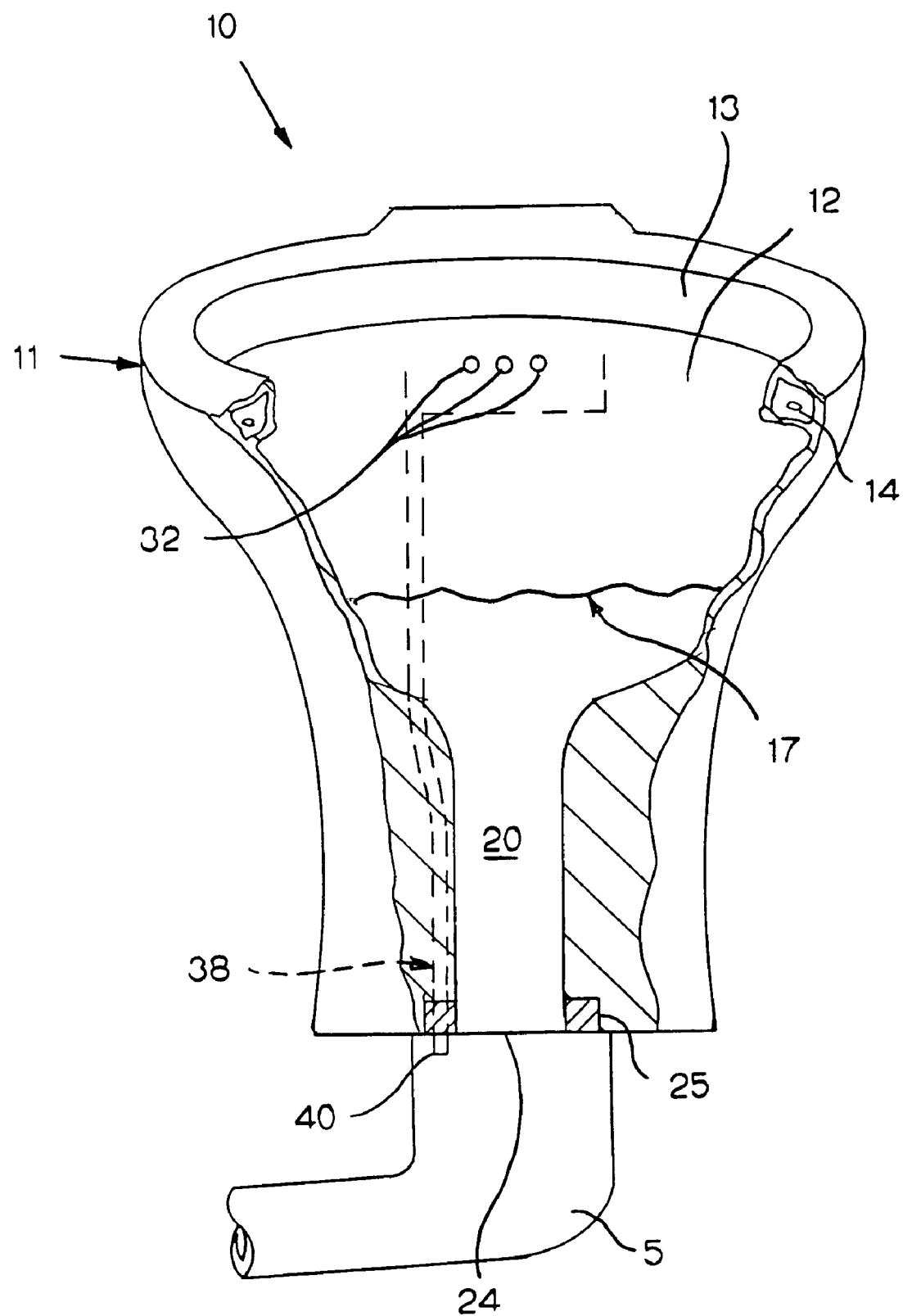
FIG. 2 is a partial cross-sectional front view of the anti-overflow fixture shown in FIG. 1.

Referring now to the drawings, improved bathroom fixtures 10, 110 for flushing bodily waste materials into a sewer system, hereinafter referred to as "bathroom fixture" or "fixture," are shown.

Each fixture 10 has a traditional primary drain 20 and a secondary anti-overflow drain 30. Similarly, each fixture 110 has a traditional primary drain 120 and a secondary anti-overflow drain 30.

With the exception of the novel secondary anti-overflow drain 30, the fixtures 10, 110 are substantially the same in size, shape, configuration, and operation as a conventional toilet or urinal respectively.

Particularly, each fixture 10, 110 includes the following standard features commonly found in conventional toilets and urinals: a structural body or base 11 containing a generally annular-shaped bowl or basin 12 that receives the waste material and a respective primary waste drain system 20, 120 that is in fluid communication with the basin 12. Each drain 20, 120 is configured having a series of bends that form a liquid trap 22. This trap 22 operates to cause an amount of water to remain within the basin 12 after each time the fixtures 10, 110 are used or flushed. It should be appreciated that the waterline 17, i.e., the height of the amount of water left in the basin 12 after each flush, is determined by the relative volumes of the basin 12 and the primary drain pipes 20, 120 and the height that trap 22 extends upward relative to the basin 12.

Figure 3:
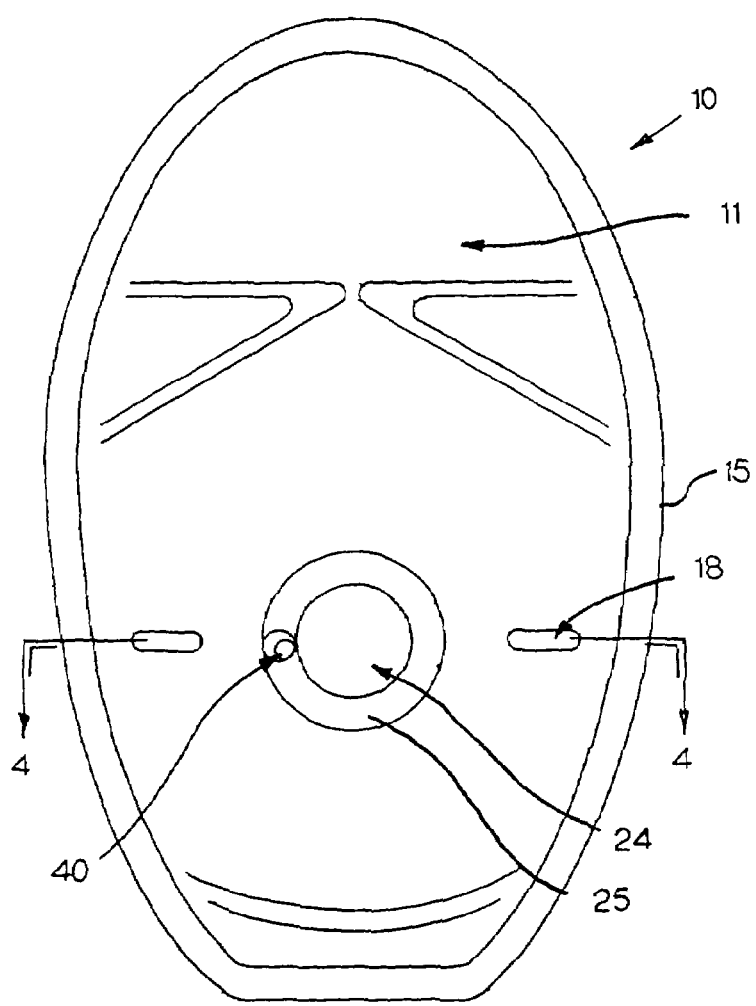
FIG. 3 is bottom view of the anti-overflow fixture shown in FIGS. 1 and 2.
Figure 4:
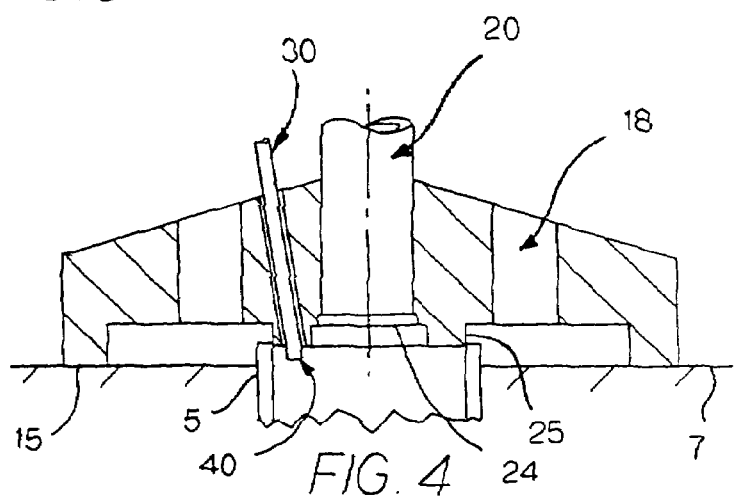
FIG. 4 is a view through section 4-4 shown in FIG. 3.
Figure 5:
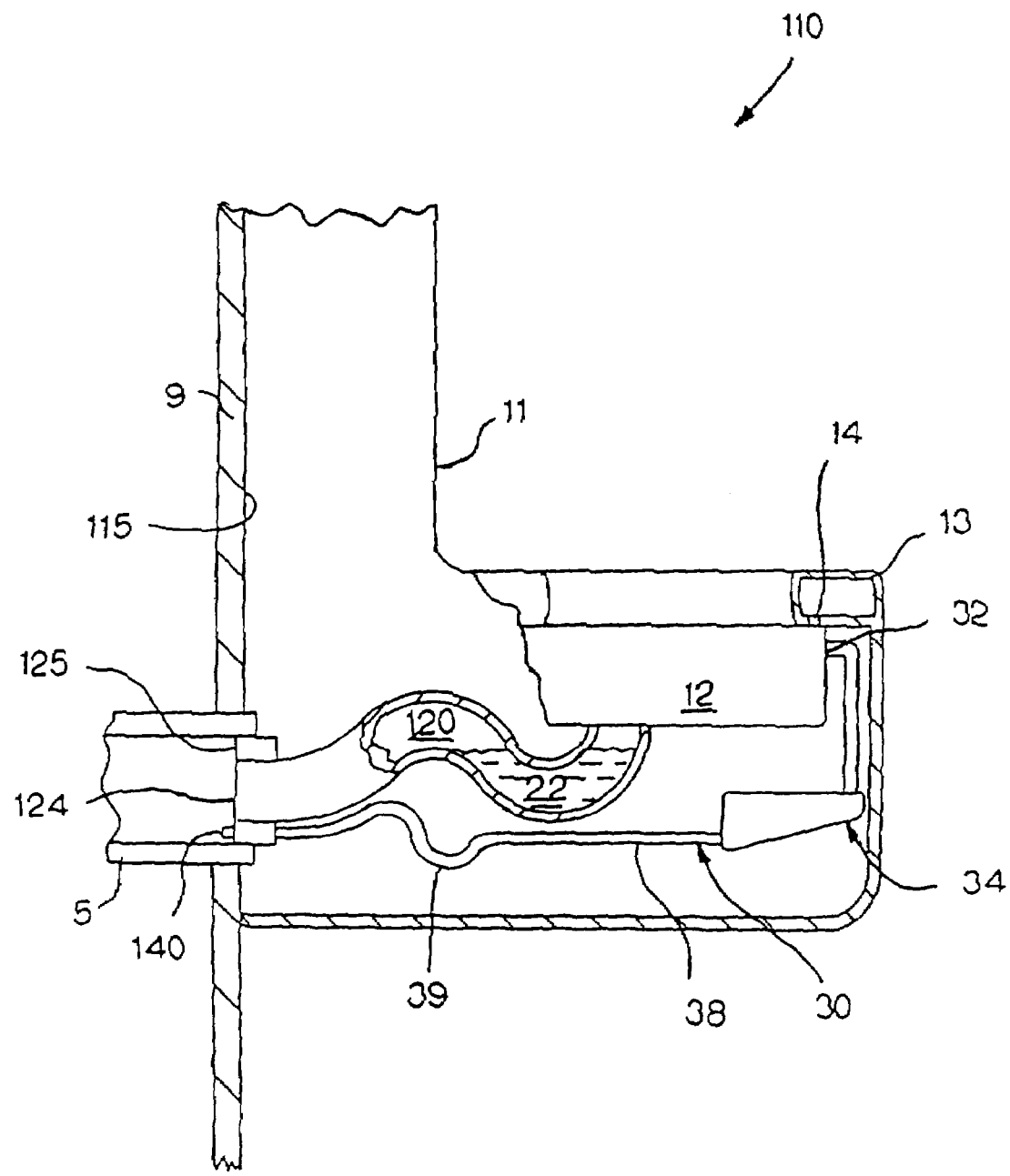
FIG. 5 is a partial cross-sectional side view of an anti-overflow fixture according to an alternate embodiment of the invention.

It should be readily apparent that in the embodiment of the invention depicted in FIGS. 1-4, the body 11 of bathroom fixture 10 is a toilet and in FIG. 5, the body 11 of bathroom fixture 110 is a urinal.

A tank or source of flushing water (not shown) of conventional design is fluidly coupled to the fixtures 10, 110 to provide the water needed to flush the contents of fixtures 10, 110. The tank may be located in substantially any position relative to the fixtures 10, 110. For example, the tank may be physically mounted directly to the fixtures 10, 110 or at a remote position. Similarly, a pressurized water line and a check valve system may be employed in place of the tank system as a source of flushing water.

Further, each fixture 10, 110 also includes a rim 13 which define the upper edge of basin 12. Rim 13 includes a plurality of flush water outlets 14. These flush water outlets 14 are fluidly coupled to a source of flushing water, such as the above-described tank. The outlets 14 are oriented to direct an amount of flushing water to cascade down the basin 12 each time the fixtures 10, 110 are flushed. As the rim 13 and outlets 14 are conventional they will not be discussed in any greater detail.

Openings 18 for fastening the body 11 of the fixture are formed through the portion of the body 11 in close proximity to the bathroom's mounting surface (i.e., the floor or wall). These openings 18 permit conventional hardware or fasteners to fixedly hold the body 11 to that bathroom surface.

It should be appreciated that in the fixture 10, which has its body 11 configured as a toilet, a seat (not shown) is normally mounted upon the rim 13.

With respect to fixture 10 and as is best shown in FIGS. 3 and 4, drain 20 terminates at a primary discharge port 24 located in close proximity to the bottom edge 15 of the fixture 10. Primary discharge port 24 includes a cylindrical collar 25 that is sized to slide into the opening of a standard sanitary line or plumbing 5 that is normally found beneath a bathroom floor 7. It should be appreciated that plumbing 5 is a length of conventional pipe that is usually orthogonal to the floor and terminates either even with or projects slightly above the level of floor 7. In combination with a conventional sealing material, such as a wax ring, the primary discharge port 24 and plumbing 5 are fluidly coupled to enable drain 20 to act as the primary means for flushing waste material down the fixture 10.

As shown in FIGS. 1-4, the preferred embodiment of the bathroom fixture is configured as a toilet. Fixture 10 includes a secondary drain 30 that is fluidly coupled to the basin 12 through a plurality of inlet holes 32 formed in the back wall of the basin 12. These holes 32 are formed in the basin 12 at a location that is above the typical waterline 17 of the fixture 10. Each of the inlets 32 are located below the flush water outlets 14 found in the rim 13.

In the preferred embodiment of the invention, there are three to five inlet holes 32 that are each approximately ⅜ inch in diameter. In one embodiment, the holes 32 are disposed in a line that is substantially parallel to the waterline 17 and located approximately one to three inches beneath the rim 13. This location of the holes 32 ensures that waste water will not enter holes 32 unless there is a blockage (i.e., when waste water backs up toward the top of the basin 12), while concomitantly receiving a small amount of the water being emitted from the flush water outlets 14 during each flush to keep the drain 30 relatively clean and preventing the water in the drain 30 from becoming stagnant.

The location, quantity, size, shape and orientation relative to each other of the inlet holes 32 may vary and holes 32 need only be disposed below the outlets 14 and above the waterline 17 to operate as inlets for secondary drain 30.

In the preferred embodiment of the invention, secondary drain 30 also includes an overflow reservoir 34. Reservoir 34 is an enclosed generally rectangular member that is disposed in the body 11 of fixtures 10, 110. Reservoir 34 has a front side 33 that is in fluid communication with each of the inlet holes 32. The bottom or floor 36 of reservoir 34 angles downward away from front side 33 and inlets 32 and terminates at an outlet hole 35 located at the lowest point of reservoir 34. As shown, reservoir 34 is shaped to receive any liquid from inlets 32 and funnel that liquid toward the outlet hole 35 formed in the bottom of the reservoir.

Drain 30 further includes an overflow drain tube 38. In the preferred embodiment of the invention, drain 38 is approximately one-half inch in inside diameter and is fluidly coupled to the outlet hole 35.

Drain 38 extends down the body 11 to a secondary discharge port 40. As shown best in FIGS. 3 and 4, secondary discharge port 40 passes through an aperture formed in the collar 25 and extends approximately one-half to one inch beyond the collar 25. When coupled to a standard drain 5, the extended length of port 40 beyond the collar 25 causes the secondary drain 30 to physically project into the plumbing 5 beyond the primary discharge port 24 of primary drain 20.

Drain tube 38 is configured having a series of bends that form a liquid trap 39. This trap 39 is disposed along the length of tube 38 between the outlet hole 35 and the secondary discharge port 40. Trap 39 operates to cause an amount of water to remain within the drain tube 38 after each time fixtures 10, 110 are used or flushed. This trapped water in drain tube 38 prevents sewer gases and odors from passing through the secondary drain 30 into the lavatory.

Referring now to FIG. 5, an alternative embodiment of the invention is shown whereby the body 11 of the fixture 110 is shaped as a urinal. With the exception of the shape of the body 11 and the following changes due to the normal wall mounting of a urinal instead of the conventional floor mounting of a toilet, the components, configuration, and operation of the invention is identical to that described above with like parts having like reference numbers.

In fixture 110, the primary drain 120 terminates at a primary discharge port 124 located in close proximity to the back edge 115 of the fixture 110. Primary discharge port 124 includes a cylindrical collar 125 that is sized to slide into the opening of a standard sanitary line or plumbing 5 that is normally found behind a bathroom wall 9. It should be appreciated that plumbing 5 is a length of conventional pipe that is usually orthogonal to the wall and terminates either even with or projects slightly beyond the wall 9.

As shown in FIG. 5, the drain tube 38 extends down the body 11 to a secondary discharge port 140. Secondary discharge port 140 passes through an aperture formed in the collar 125 and extends approximately one-half to one inch beyond the collar 125. When coupled to a standard drain 5, the extended length of port 140 beyond the collar 125 causes the secondary drain 30 to physically project into the plumbing 5 beyond the primary drain 120.

Figure 6:
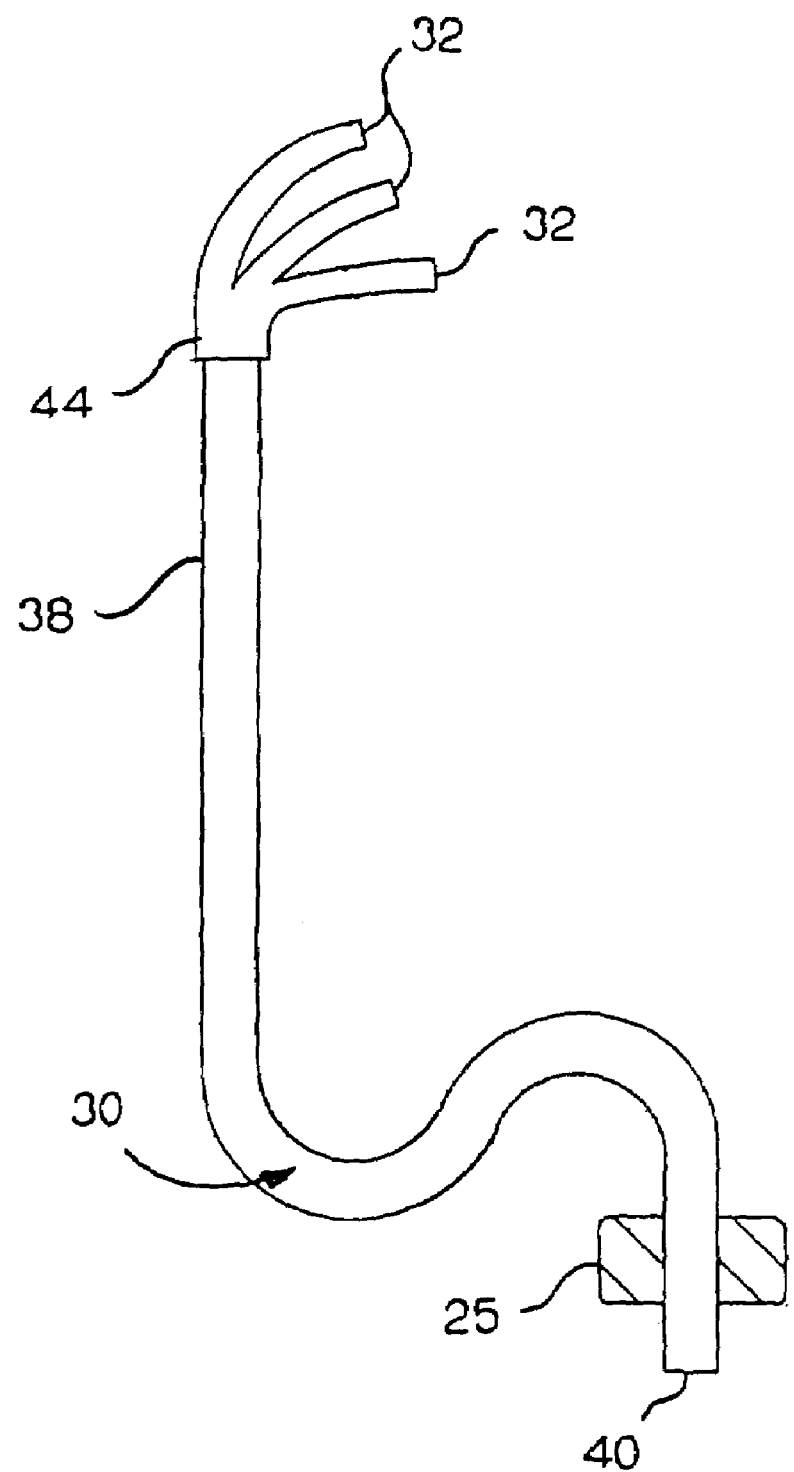
FIG. 6 is a view of the secondary drain of an anti-overflow fixture according to alternate embodiment of the invention.

Referring now to FIG. 6, an alternative embodiment of the secondary drain 30 is shown wherein the reservoir 34 is eliminated and is replaced by a pipe union 44. Union 44 is fluidly coupled to each of the inlet holes 32 at one end and to the drain tube 38 at the other.

In operation, when the primary drains 20, 120 become obstructed or blocked, the flushing water and waste material will begin to back up toward the top of the basin 12. The secondary drain 30 redirects the backed-up liquid back to the sewer 5 in the following manner:

Once the liquid backs up to the height of the inlet holes 32, the liquid will flow through these inlets 32 and collect in the reservoir 34. The angled shape of reservoir 34 causes the liquid to flow down through the outlet 35 into the overflow drain tube 38. The liquid flows through the drain tube 38 and passes out of the secondary drain 30 through the respective secondary discharge port 40, 140 that extends into the sewer plumbing 5 beyond the obstructed primary drains 20, 120.

Thus it is understood that I have described an improved bathroom fixture having a secondary anti-overflow drain which may be readily installed in place of substantially any previous fixture (i.e., toilet or urinal) without any modification to the current plumbing or sewer system.

It should be appreciable to one skilled in the relevant art that the above described improved bathroom fixture may be made from various materials and be configured in various shapes and sizes without going beyond the scope and intent of the present invention.

In the preferred embodiment, the fixture is made from a ceramic material such as porcelain. In other embodiments the fixture may be formed from other hard, durable, and waterproof materials, such as plastic or metal.

In one embodiment of the invention, the secondary drain 30 is integrally formed within the body structure 11 of the fixture. For example, the drain 30 could be cast directly into the mold of a body 11 made of porcelain.

In other embodiments, however, the secondary drain 30 may be a system of components separate from the structural body 11 of the fixture. That is, secondary drain 30 may be removably coupled to the basin 12 and body 11 to facilitate ease of manufacture or cost considerations. In this alternative preferred embodiment, drain 30 may be partially formed from conventional pipe material such as metal or plastic pipe.

In still other embodiments, some components of the secondary drain 30 may be integrally formed with the body 11, such as inlets 32, while other portions of the secondary drain, such as reservoir 34, overflow drain tube 38, and secondary discharge ports 40, 140 may be coupled to the body 11 to define the fixture.

In still yet other embodiments, the drain tube 38 and trap 39 may be mounted external to the body 11 and wherein a first end of the drain tube 38 extends through the body 11 to fluidly communicate with the inlet means 32, and the opposite end of the overflow drain tube 38 also extends through another aperture formed in the body 11 to fluidly communicate with the discharge port 40, 140.

In still yet other embodiments, the secondary drain 30 may be provided as separate components that are disposed within openings and passages formed within the body 11, effective to hide the secondary drain 30 within the body 11.

Having described our invention, we claim:

1. An anti-overflow bathroom fixture that is fluidly coupled to a sewer drainage pipe, said fixture comprising:
   a structural body portion having a waste receiving basin that includes an upper rim and which holds an amount of water at a certain water level;
   a primary drain that is fluidly coupled to said basin and which terminates at a drain passage in a tubular collar extending downwardly from a bottom end of said body portion, said collar having an inner surface which defines said drain passage, a cylindrical outer surface and a thickness between said outer surface and said inner surface and is fluidly coupled to said sewer drainage pipe; and
   a secondary drain that fluidly couples said basin to said sewer drainage pipe, said secondary drain including:
      inlet means that are disposed within said basin between said rim and said certain water level;
      an overflow drain tube that is approximately one half inch in inside diameter and is in fluid communication with said inlet means; and
      a discharge port that is in fluid communication with said overflow drain tube and is disposed within and runs through said thickness of said collar;
   wherein said collar projects downwardly into said sewer drainage pipe such that a lower end of said outer surface is telescopically received within said sewer drainage pipe when said collar is fluidly coupled to said sewer drainage pipe, whereby said inlet means permits rising waste water to flow from said basin into said overflow drain tube and out of said discharge port to said sewer drainage pipe.

2. The anti-overflow bathroom fixture of claim 1 wherein said structural body portion is a toilet base.

3. The anti-overflow bathroom fixture of claim 1 wherein said secondary drain is integrally formed into said structural body portion.

4. The anti-overflow bathroom fixture of claim 1 wherein said overflow drain tube is mounted external to said structural body portion, whereby a first portion of said overflow drain tube extends through said body to fluidly communicate with said inlet means and a second portion of said overflow drain tube extends through said body to fluidly communicate with said discharge port.

5. The anti-overflow bathroom fixture of claim 1 wherein the primary drain and secondary drain run independently through said bathroom fixture.

6. An anti-overflow bathroom fixture for flushing bodily waste into a sanitary discharge pipe, comprising:
   a structural body portion having a waste-receiving basin with a waste outlet at its lowermost portion;
   a collar extending downwardly from an underside of the structural body portion, the collar comprising a tubular wall having a thickness between inner and outer surfaces, wherein said inner surface defines a fluid passage and said outer surface is sized to be received within said sanitary discharge pipe;
   a primary drain formed in the structural body portion having a primary drain inlet that is in fluid communication with said basin waste outlet, said primary drain terminating at and is in fluid communication with the collar's fluid passage; and
   a secondary drain having at least one inlet hole formed in said basin above said waste outlet, the secondary drain passing through the structural body portion wholly apart from the primary drain and exiting through a secondary discharge port running through the thickness of the wall of the collar adjacent to, but apart from, the fluid passage;
   wherein the collar is coupled to the sanitary discharge pipe, such that the primary drain and the secondary drain are each independently in fluid communication with the sanitary discharge pipe.

7. The anti-overflow bathroom fixture of claim 6 wherein said secondary drain is integrally formed into said structural body portion.

8. The anti-overflow bathroom fixture of claim 6 wherein the outer surface is cylindrical in shape and is at most four inches in diameter.

9. The anti-overflow bathroom of claim 6 wherein the waste-receiving basin which contains an amount of pre-flush water at a certain level, wherein said at least one inlet hole is located above said pre-flush water level.

10. The anti-overflow bathroom fixture of claim 6 wherein said waste-receiving basin has an uppermost rim portion, wherein said at least one inlet hole is located below said rim.

11. The anti-overflow bathroom fixture of claim 10 wherein the fixture is coupled to a source of flush water, the flush water flowing along the waste-receiving basin each time the fixture is flushed such that a portion of said flush water flows into the at least one inlet hole.

12. The anti-overflow bathroom fixture of claim 9 wherein said structural body portion is a toilet base.

13. The anti-overflow bathroom fixture of claim 6, wherein fluid entering said secondary drain remains separate from any fluid passing through said primary drain prior to entering said sanitary discharge pipe.

14. The anti-overflow bathroom fixture of claim 1, wherein fluid entering said secondary drain remains separate from any fluid passing through said primary drain prior to entering said sewer drainage pipe.

15. An anti-overflow bathroom fixture for flushing bodily waste into a sanitary discharge pipe, comprising:
   a structural body portion having a waste-receiving basin with a waste outlet;
   a discharge tube extending substantially vertically downwardly from an underside of the structural body portion comprising a non-deformable annular wall having an inner surface that circumscribes a fluid passage and an outer surface, wherein said discharge tube has a thickness between said inner surface and outer surface and said outer surface is sized to be received within the sanitary discharge pipe;
   a primary drain formed in the structural body portion having a primary drain inlet that is in fluid communication with said basin waste outlet, said primary drain terminating at and is in fluid communication with said fluid passage; and
   a secondary drain having at least one inlet hole formed in said basin above said waste outlet, the secondary drain passing through the structural body portion wholly apart from the primary drain and exiting through a secondary discharge port running through the thickness of the discharge tube adjacent to, but apart from, the fluid passage;
   wherein the discharge tube is coupled to the sanitary discharge pipe, such that the primary drain and the secondary drain are each independently in fluid communication with the sanitary discharge pipe.

16. The anti-overflow bathroom fixture of claim 15 wherein said discharge tube is integrally formed with said structural body portion.

17. An anti-overflow bathroom fixture that is fluidly coupled to a sewer drainage pipe through a sewer inlet aperture, said fixture comprising:
   a structural body portion comprising:
      a waste receiving basin that includes an upper rim and which holds an amount of water at a certain water level; and
      a tubular collar that extends downwardly from an underside of said structure body portion and which circumscribes a fluid passage, said collar having an outer diameter and a thickness which are receivable within said sewer inlet aperture;
   a primary drain that is fluidly coupled to said basin and which terminates at and is in fluid communication with said fluid passage of said collar; and
   a secondary drain comprising:
      inlet means that are disposed within said basin between said rim and said certain water level;
      outlet means formed through the thickness of the collar, said outlet means remaining wholly separate from said primary drain and said fluid passage of said collar; and
      an overflow drain passage that in fluid communication with said inlet means at one end and with said outlet means at the opposite end;
   whereby said secondary drain permits waste water rising within said basin to flow from said basin into said inlet means, through said overflow drain tube, and out of said outlet means to said sewer drainage pipe.

18. The anti-overflow bathroom fixture of claim 17 wherein said collar further comprises:
   an inner wall, which defines said fluid passage;
   a radially outermost wall defining said outer diameter; and
   a bottom face that interconnects and depends from both said inner wall and said outer wall, said bottom face spanning said thickness of said collar.

19. The anti-overflow bathroom fixture of claim 18, wherein said outlet opening passes through said bottom face.

20. An anti-overflow bathroom fixture for flushing bodily waste into a sanitary discharge line having an inlet aperture, said fixture comprising:
   a structural body portion;
   a primary drain that terminates at and is in fluid communication with said sanitary discharge line; and
   a secondary drain which extends downwardly from a bottom end of said structural body portion into said inlet aperture a distance beyond where said primary drain terminates at said sewer pipe.

21. The bathroom fixture of claim 20 wherein said fixture includes a catch basin which contains water at a certain level and which initially receives said bodily waste, said basin having an upper rim portion with flush water outlets and is in fluid communication with said primary drain, wherein said secondary drain comprises:
   at least one inlet hole that is formed in said basin below said rim and above said certain level of water; and
   a drain passage that is in fluid communication with said at least one inlet hole and said sanitary discharge line.

22. The bathroom fixture of claim 20 wherein said primary drain terminates at a tubular collar having a thickness between radially inner and outer surfaces, said collar extending downwardly from a bottom surface of said structural body portion, a portion of said collar outer surface extending into said inlet aperture, and wherein said secondary drain terminates at a discharge port that passes through said thickness of said collar.

23. The bathroom fixture of claim 22 wherein said discharge port extends approximately one half inch past said collar.

24. The bathroom fixture of claim 20 wherein said secondary drain further includes a liquid trap means which prevents sewer gases from passing through said secondary drain.

25. The bathroom fixture of claim 20 wherein said structural body portion is shaped as a toilet.

26. The bathroom fixture of claim 20 wherein said secondary drain is disposed external to said body portion and passes through an aperture formed in said body portion to fluidly communicate with said sanitary discharge line.

27. The bathroom fixture of claim 20 wherein said secondary drain is integrally formed within said body portion.

28. The bathroom fixture of claim 20 wherein the primary drain and secondary drain run independently through said bathroom fixture.

* * * * *